US008799609B1

(12) United States Patent
Bauer et al.

(10) Patent No.: US 8,799,609 B1
(45) Date of Patent: Aug. 5, 2014

(54) ERROR HANDLING

(75) Inventors: Andreas L. Bauer, Boxborough, MA (US); Francis P. Litterio, Blackstone, MA (US); Joseph Gugliemino, Berlin, MA (US)

(73) Assignee: EMC Corporation, Hopkinton, MA (US)

( * ) Notice: Subject to any disclaimer, the term of this patent is extended or adjusted under 35 U.S.C. 154(b) by 312 days.

(21) Appl. No.: 12/494,375

(22) Filed: Jun. 30, 2009

(51) Int. Cl.
*G06F 12/00* (2006.01)
*G06F 3/00* (2006.01)
*G06F 9/00* (2006.01)
*G06F 12/02* (2006.01)
*G06F 3/06* (2006.01)
*G06F 9/50* (2006.01)

(52) U.S. Cl.
CPC .............. *G06F 12/023* (2013.01); *G06F 3/067* (2013.01); *G06F 9/5016* (2013.01)
USPC ........................................................ 711/170

(58) Field of Classification Search
USPC ........................................................ 711/170
See application file for complete search history.

(56) References Cited

U.S. PATENT DOCUMENTS

| | | | | |
|---|---|---|---|---|
| 6,056,428 | A * | 5/2000 | Devoino et al. | 703/2 |
| 6,363,503 | B1 * | 3/2002 | Clauss et al. | 714/57 |
| 2003/0048469 | A1 * | 3/2003 | Hanson | 358/1.14 |
| 2004/0119739 | A1 * | 6/2004 | Grotjohn | 345/744 |
| 2005/0001024 | A1 * | 1/2005 | Kusaka et al. | 235/375 |
| 2006/0253854 | A1 * | 11/2006 | Elvanoglu et al. | 718/100 |
| 2007/0094448 | A1 * | 4/2007 | Reasoner et al. | 711/115 |
| 2007/0299962 | A1 * | 12/2007 | Budzisch et al. | 709/224 |
| 2008/0072896 | A1 * | 3/2008 | Setzer et al. | 128/200.24 |
| 2008/0082427 | A1 * | 4/2008 | Gandhi et al. | 705/28 |
| 2008/0165152 | A1 * | 7/2008 | Forstall et al. | 345/173 |

\* cited by examiner

*Primary Examiner* — Matthew Bradley
*Assistant Examiner* — Craig Goldschmidt
(74) *Attorney, Agent, or Firm* — Krishnendu Gupta; Joseph D'Angelo

(57) ABSTRACT

A method, system and computer product for use in error handling comprising receiving, from a requester, a data storage configuration request comprising sub-tasks, determining, from a plurality of user levels, a first user level at which said data storage configuration request is made, each user level of said plurality of user levels being associated with a respective different level of abstraction with respect to processing performed in the data storage system for servicing the data storage configuration request, servicing said data storage configuration request, storing, in an error structure, the success of each sub-task of the data storage configuration request, based on the storing, recording in an error tree whether each sub-task of the data storage configuration request executed successfully, and based on the first user level, displaying a report of the status of the data storage configuration request as recorded in the error tree.

18 Claims, 12 Drawing Sheets

ERROR OBJECT TREE EXAMPLE (PARTIAL)

ERROR STRUCTURE

800

Operation: <name of attempted operation>
Errorcode: <specific, unique error code>
Status: <pass | fail | not attempted>
Details: <details about operation and failure that help the user triage>
Remedy: <instructions on how to work around or fix the problem so error does not occur>
Sub-Operations: <pointers to error objects for operations attempted by the operation of this error object>

FIG. 8

ERROR HANDLING

BACKGROUND

1. Technical Field

This application relates to error handling.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems may provide data and access control information through the channels to the storage device and the storage device provides data to the host systems also through the channels. Conventionally, the host systems do not address the disk drives of the storage device directly, but rather, access what appears to the host systems as a plurality of logical disk units. The logical disk units may or may not correspond to the actual disk drives. This can allow multiple host systems to access the single storage device unit to allow the host systems to share data in the device. In order to facilitate sharing of the data on the device, additional software on the data storage systems may also be used.

Different tasks may be performed in connection with a data storage system. For example, a customer may perform data storage configuration tasks. Such tasks may include configuring storage for use with an email application. In connection with the configuration processing, tasks may include allocating storage, specifying the logical and/or physical devices used for the storage allocation, specifying whether the data should be replicated, the particular RAID (Redundant Array of Independent or Inexpensive Disks) level, and the like. A customer may be required to perform each of the various configuration processing tasks including those about which the customer may not be knowledgeable and may result in adverse consequences, such as improper configuration.

SUMMARY OF THE INVENTION

A method, system and computer product for use in error handling comprising receiving, from a requester, a data storage configuration request comprising sub-tasks, determining, from a plurality of user levels, a first user level at which said data storage configuration request is made, each user level of said plurality of user levels being associated with a respective different level of abstraction with respect to processing performed in the data storage system for servicing the data storage configuration request, servicing said data storage configuration request, storing, in an error structure, the success of each sub-task of the data storage configuration request, based on the storing, recording in an error tree whether each sub-task of the data storage configuration request executed successfully, and based on the first user level, displaying a report of the status of the data storage configuration request as recorded in the error tree.

BRIEF DESCRIPTION OF THE DRAWINGS

Features and advantages of the present invention will become more apparent from the following detailed description of exemplary embodiments thereof taken in conjunction with the accompanying drawings in which:

FIG. 8 illustrates an example embodiment of an error structure;

DETAILED DESCRIPTION OF EMBODIMENT(S)

Figure 1:
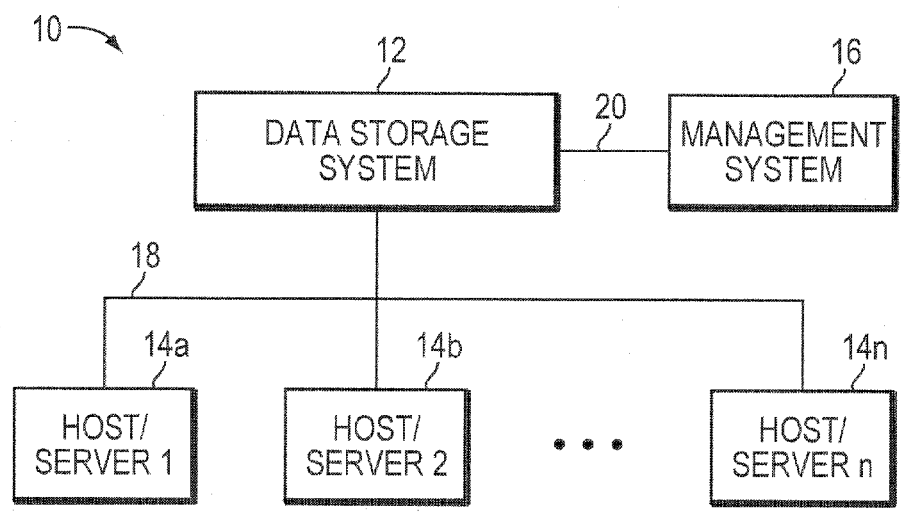
FIG. 1 illustrates an example of an embodiment of a system that may utilize the techniques described herein.

It may be desirable to utilize a flexible technique ("current technique") described below which assists users (e.g., customers) in connection with performing data storage services such as data storage configuration and more specifically with the display and handling of errors associated therewith. It may be desirable that the technique be adaptable to respond with error notifications generated from execution of a requested task that are in accordance with different customer proficiency levels so the error description corresponds to the level of control and proficiency level of the user. It may be desirable to vary the level of control and operations of error notifications for different proficiency levels.

Thus, at least some implementations of the current technique present a way to collect and return error information in systems that leverage many different components at different levels to perform operations. For example, in provisioning storage for an instance of an email server application such as Microsoft Exchange, many different components may be involved. For example, 1) the user may interact with a wizard that collects information and then makes a single or very abstract request to a provisioning service; 2) the provisioning service may interact with subordinate services to get capacity from a pool service and then create higher level storage objects that will be exposed to the server running the email server application; 3) the pool service in turn may communicate with an abstract capacity management service that in turn invokes different application program interfaces (API)s on network attached storage (NAS) and block storage services. In the described provisioning example, there are multiple levels of operations that must be performed in order for the provisioning to be successfully execute. Each level of operation may be envisioned as a leaf in an operation tree structure.

Any one of these operations can fail. At least some implementations of the current technique provide a way to leverage a tree structure for error objects that maps to an operation tree that maps to individual operations that can fail. At each level in the operation tree, raw error information may be collected and may be processed at that level to provide troubleshooting and workaround information.

In at least some implementations of the current technique, when a Graphical User Interface (GUI) receives an error, the error has structure denoting background information such as the level at which the error occurred and the levels that successfully executed. The GUI extracts necessary error information and displays it to the user according to a "pyramid level" at which the user is operating. With respect to the pyramid level, EXPERT users may be displayed all or nearly all of the information about errors, error codes, and/or reasons for failure of operations at each level, which could be compared to the bottom portion of a pyramid. INTERMEDIATE users may be able to see a somewhat redacted view of all the information, similar to the middle portion of a pyramid. NOVICE basic users may only need to look very little or top level information similar to the top of a pyramid.

An example error structure may report the following information for each error level:
  Error code
  Pass/Fail/Not attempted
  Remedy instructions
  Specific reason information In at least some implementations of the current technique, while a complex operation is being processed, the operations may be tracked in the tree structure corresponding to each task performed or to be performed that is used to implement a transaction concept with roll-back and/or continue semantics.

The current technique also may support a preview capability to support wizard and form GUIs wherein a configuration or configuration parameter change set can be tested and specific incorrect parameters can be pointed out before an operation is attempted. Aspects of the current technique may be leveraged to support multiple uses cases such as:
  GUI attempting to change several configuration aspects that may not be compatible with each other.
  Complex operations wherein the GUI makes a single call but the operation can fail for different reasons at different levels.
  Multi-object operations: the same operation (such as parameter change) is applied to many objects of the same type.
Aspects of the current technique may include details such as translating between exceptions and scalar error messages when heterogeneous modules are used.

In any computer process, things may go wrong at any level and failures may need to be dealt with in different ways. For example, a partial failure may be reported and the operation may be resumed and retried. The operation may be rolled back. At any level different degrees of triage and interpretation can happen. At least one implementation of the current technique can summarize, add interpretation, and collect additional troubleshooting information. As well, different levels of descriptiveness of the errors can be given as different user personas need different levels of error information from an error pyramid. At least one implementation of the current technique may also make a final decision on what is reported at a presentation level and allow users to drill down.

Description of an Exemplary Data Storage System

The following examples of provisioning with respect to a data storage system will be helpful in understanding the complexities of error handling. For example, errors can occur at any given level of the provisioning process. Referring to FIG. 1, shown is an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations.

The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP.

It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with configuring and provisioning the data storage for use by the hosts in connection with techniques described herein. As an example in connection with an email application server component that may executed on the hosts 14a-14n, the data storage configuration and provisioning tasks may include allocating storage for user accounts or mailboxes, specifying the devices (logical and/or physical) used to store the email data, specifying whether data replication is performed for disaster recovery, configuring the physical devices in one or more RAID groups and other logical entities, and the like.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for processing a data storage request to provision or configure data storage.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes. Data storage devices may also be configured using other logical device layers on top of the LV or LUN which are then exposed to the host or other component using the configured data storage.

Provisioning Example

Figure 2:
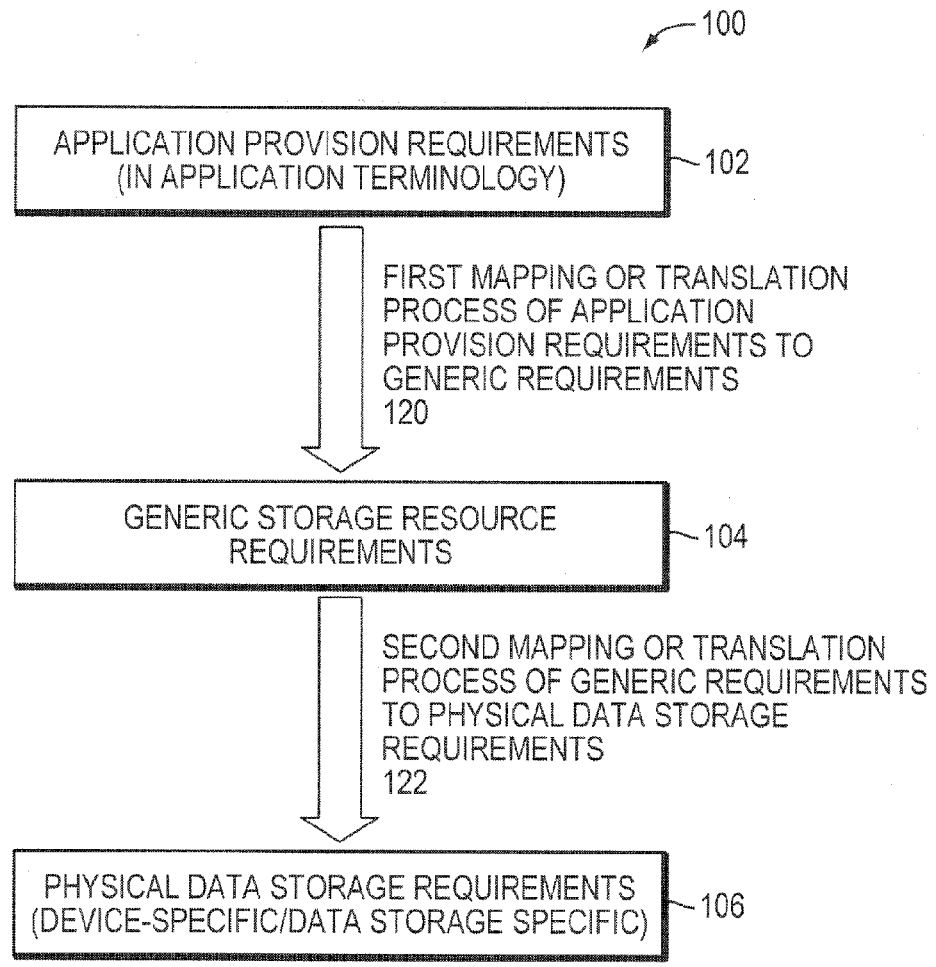
FIG. 2 is an example representation of the mapping or translation processes that may be performed in an embodiment in accordance with the techniques herein.

Referring to FIG. 2, shown is an example representation of the processing that may be performed in an embodiment which may cause an error, wherein the response to that error is in accordance with the current technique described herein. Example 100 illustrates the processing that may be performed in connection with a request to provision storage of a data storage system for use by an application. For example, a provisioning request may be made to allocate storage for a number of mailboxes for use by an email application. The example 100 includes application provision requirements 102 which may be mapped or translated into generic storage resource requirements 104 in a first mapping or translation stage 120. The generic storage resource requirements 104 may be mapped or translated into physical storage requirements 106 in a second mapping or translation stage 122. The mapping stage 120 may be performed in accordance with application best practices. The steps comprising stage 120 may vary with each application. The mapping stage 122 may be performed in accordance with data storage specific best practices. The steps comprising stage 122 may vary with the particular underlying data storage system. At any particular step during the provisioning process, errors may occur.

In an embodiment in which the data storage system has a multiprocessor architecture, a designated processor of the data storage system may be assigned to service I/O requests for one or more portions of the allocated storage. The processing of stage 122 maps the generic requirements of 104 in accordance with the different data storage specific properties that may be associated with each storage pool to the physical resources of the data storage system. As an example, each storage pool may be formed from one or more different RAID groups of physical devices. A provisioning request for a volume of storage in a storage pool is mapped to a portion of physical storage in accordance with the data storage best practices codified in 122.

Figure 3:
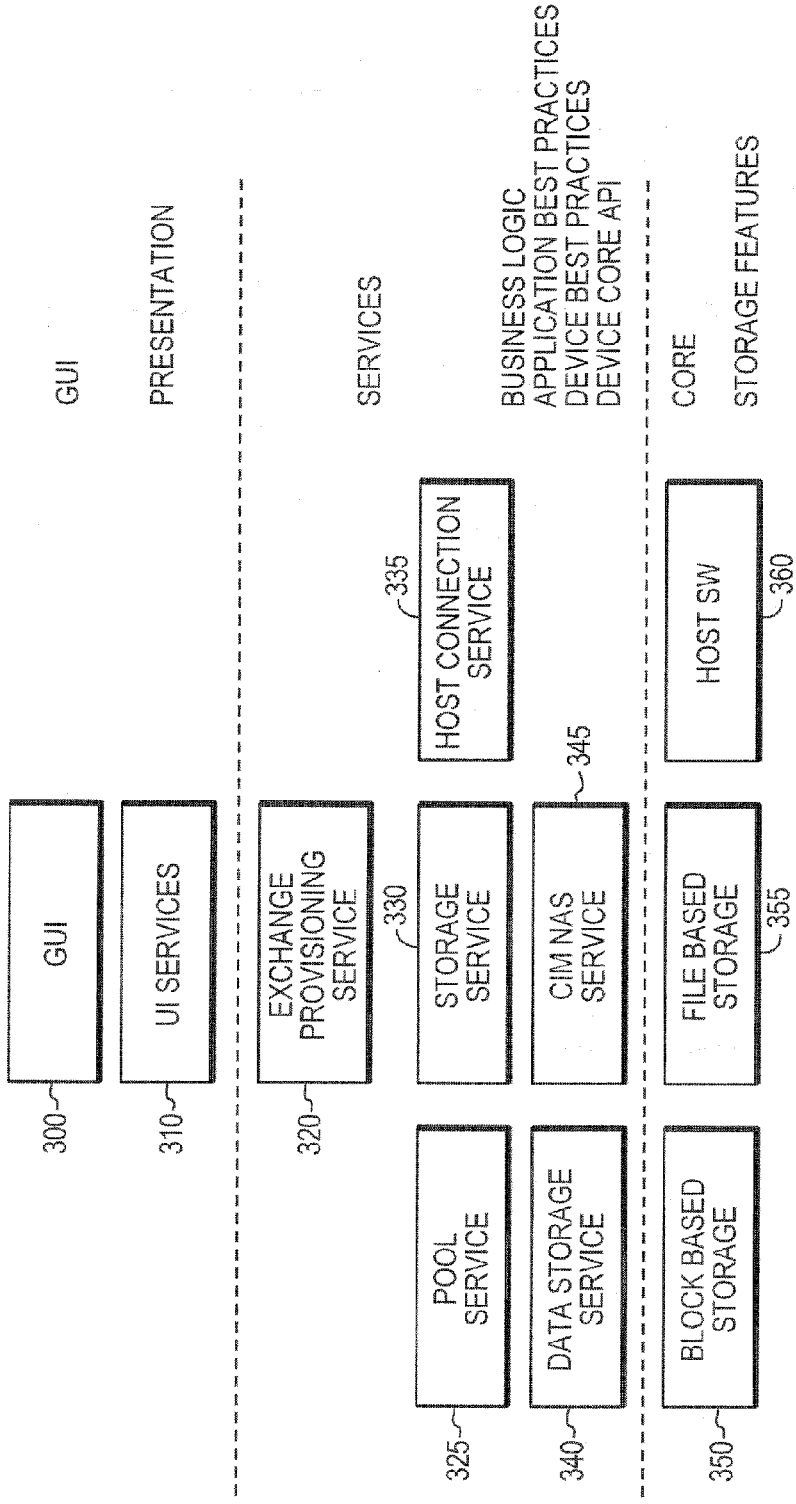
FIG. 3 is an example representation of how storage pools may be configured from physical devices in an embodiment.

Referring to FIG. 3, shown is an example of the GUI, Services, and Core of the Provisioning request. At the GUI or presentation level, there may be a GUI 300 and some User Interface (UI) Services 310. The GUI 300 and UI Services 310 enable a user to interact, for example for an Exchange or e-mail provisioning request, with Exchange Provisioning Service 320. At this Service level, there may be Pool Services 325, Storage Service 330, Host Connection Service 335, Data Storage service 340 (Clariion Service), and Common information model (CIM) Network attached storage (NAS) Service 345. These services may be software services that are used to interact with the Core. In this embodiment, the core consists of a Block based storage (or Block based storage operating system) 350, such as EMC's Flare, a File based storage (or File based storage operating system) 355, such as EMC's Dart, and a Host SW 360. A request may flow from the GUI 300, through the Services, to the Core.

Figure 4:
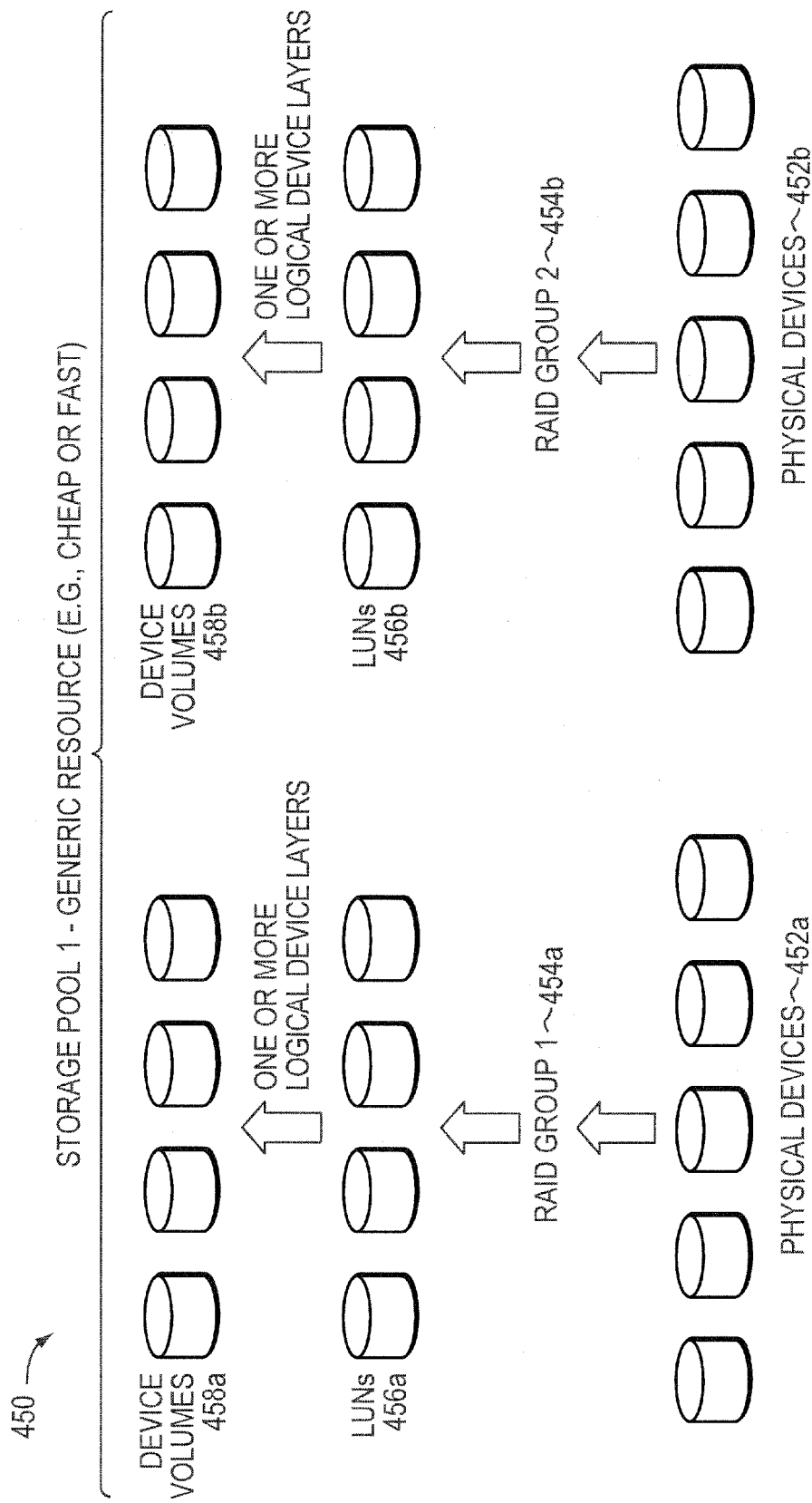
FIG. 4 is another example representation of how storage pools may be configured from physical devices in an embodiment.

Referring to FIG. 4, shown is an example representing how the storage pools may be formed. The example 450 illustrates how storage pools may be constructed from groups of physical devices. For example, RAID Group1 454a may be formed from physical devices 452a. The data storage system best practices of a policy may specify the particular RAID level and configuration for the type of storage pool being formed. For example, for physical devices 452a on a first data storage system type when forming a FAST storage pool, RAID-5 may be used in a 4+1 configuration (e.g., 4 data drives and 1 parity drive). The RAID Group 1 454a may provide a number of data storage LUNs 456a. An embodiment may also utilize one or more additional logical device layers on top of the LUNs 456a to form one or more logical device volumes 458a. The particular additional logical device layers used, if any, may vary with the data storage system. It should be noted that there may not be a 1-1 correspondence between the LUNs of 456a and the volumes of 458a. In a similar manner, device volumes 458b may be formed or configured from physical devices 452b. The storage pool 1 of the example 450 illustrates two RAID groups being used to define a single storage pool although, more generally, one or more RAID groups may be used for form a storage pool in an embodiment using RAID techniques. The RAID Group 1 454b may provide a number of data storage LUNs 456b.

Figure 5:
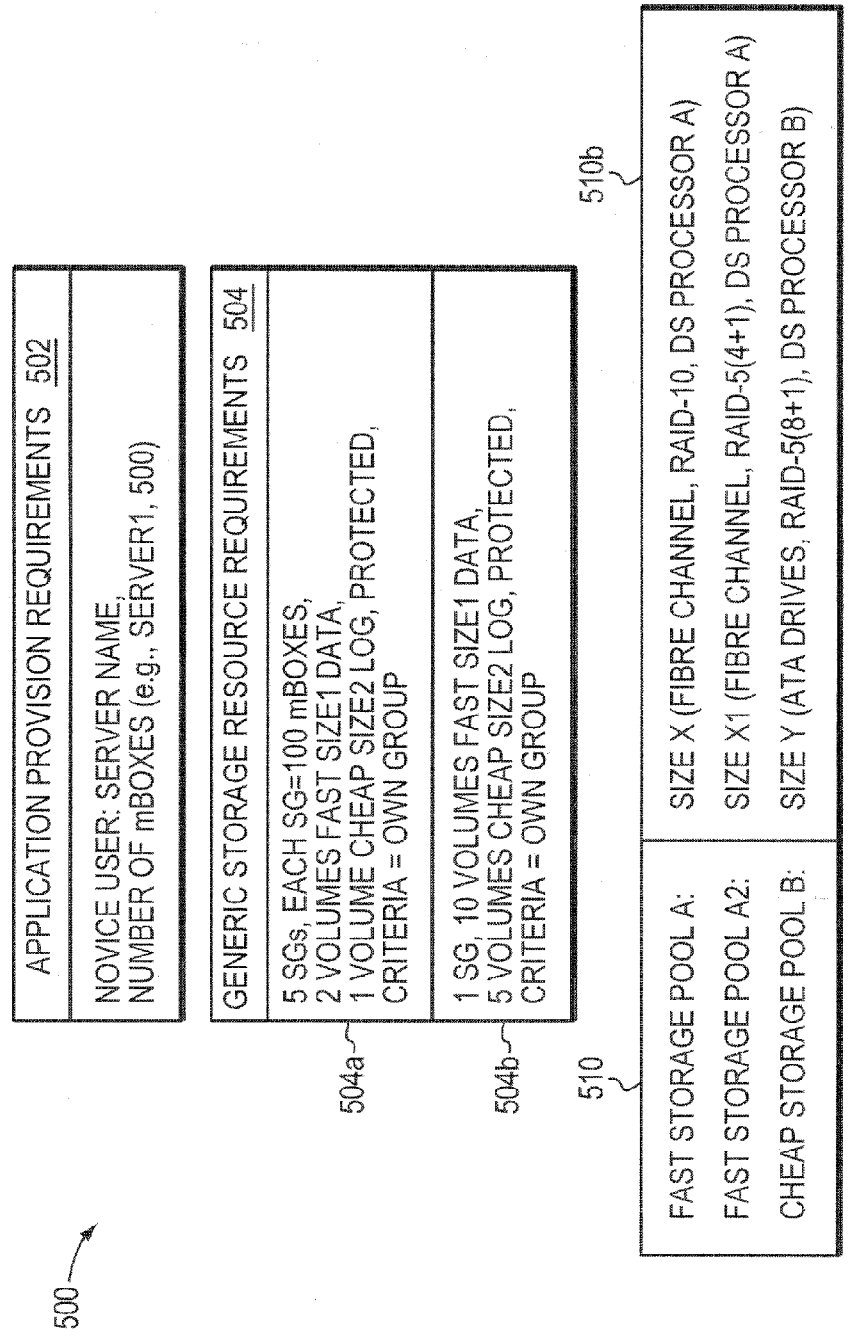
FIGS. 5 and 6 illustrate examples of use of the techniques herein in connection with provisioning storage for an application in an embodiment.

Referring to FIG. 5, shown is an example illustrating an embodiment with the two stage mapping processing as described in connection with FIG. 1. The example 500 includes application provision requirements 502 which are input in connection with a NOVICE user proficiency level for an email application hosting storage on the data storage system. In this example, the requirements of 502 include a server name, such as "SERVER1", and a number of mailboxes, such as 500. The user may be requesting that storage be allocated for 500 mailboxes for use with an email application.

In an embodiment, one or more candidate solutions or ways in which the resource provisioning request may be serviced may be specified in terms of the generic resource requirements. The example 500 illustrates two possible or candidate solutions 504a and 504b. For each of these candidate solutions, the currently available resources of the data storage system may be examined to see if the provisioning request may be implemented in accordance with each candidate solution. In other words, each candidate solution specifies amounts and types of data storage needed to fulfill the current provision request. The current state of available resources 510 on the data storage system is examined to determine if it is possible to allocate resources as needed for each candidate solution; the amount of the resources may be examined by commands 510b. It may be that there are insufficient resources available on the data storage system so that one or more candidate solutions are eliminated. In this example, candidate solution 504a indicates that 5 storage groups (SGs) may be formed in which each SG consists of storage for 100 mailboxes.

Figure 6:
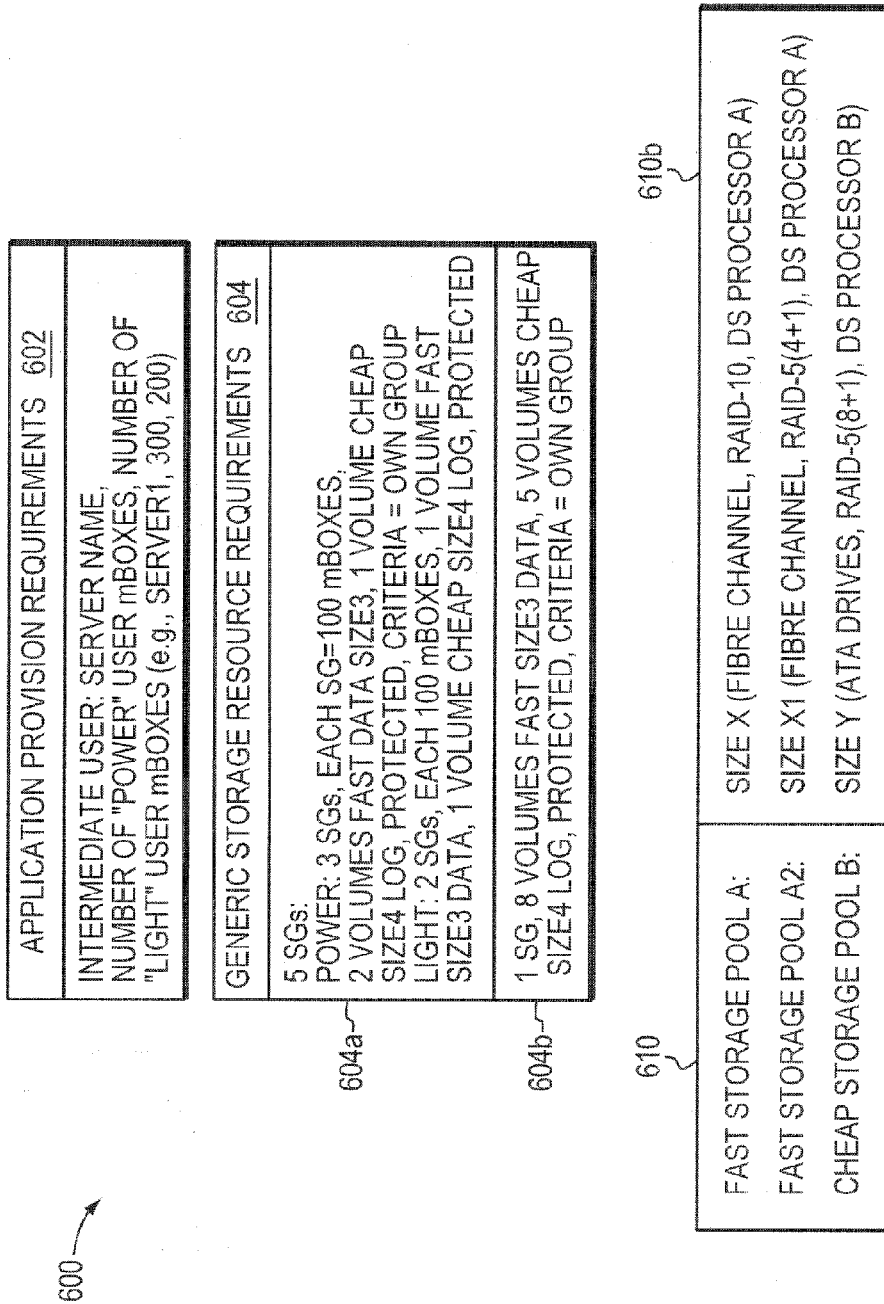

Referring to FIG. 6, shown is another example illustrating an embodiment with the two stage mapping processing as described in connection with FIG. 1. The example 600 includes application provision requirements 602 which are input in connection with an INTERMEDIATE user proficiency level for an email application hosting storage on the data storage system. In this example, the requirements of 602 include a server name, such as "SERVER1", and a number of mailboxes, such as 500. The current state of available resources 610 on the data storage system is examined to determine if it is possible to allocate resources as needed for each candidate solution; the amount of the resources may be examined by commands 510b mailboxes for use with an email application. The example 600 illustrates two possible or candidate solutions 604a and 604b.

When errors occur during the provisioning process, previous solutions to error handling have presented error codes or messaging corresponding to the particular point of failure of the operation. However, the previous solutions presented errors that were out of context and therefore did not always provide the user with the appropriate level of detail. For example, the beginner user may have been provided with too much detail in an unusable error code while the experienced user would not have been provided with enough information to correctly diagnose and correct the problem, just from the error code itself.

Description of Error Generation

Described in following paragraphs are the implementations that may be used to assist customers or other users of a data storage system in handling errors in connection with performing data storage system management tasks such as related to data storage system configuration, provisioning of data storage, and the like. The implementations herein are adaptable to the particular knowledge level of the user. The implementations are flexible and allow for implementation of best practices and defaults in an automated fashion which are customized for the particular application, user or customer, and/or underlying data storage system and environment to meet specific customer needs. As will be described in more detail, depending on the level at which a user interacts with the data storage system, different levels or amounts of automation of the best practices may be performed. Depending on how the data storage system is configured, the user may elect to see error at a high level of detail or an integrate level of system detail. User proficiency levels and exemplary embodiments are described in more detail in U.S. patent application Ser. No. 11/824,578, filed Jun. 29, 2007, APPLICATION AWARE STORAGE, which is hereby incorporated by reference herein.

For example, a customer may perform data storage configuration tasks. Such tasks may include, for example, configuring storage for use with an email application. In connection with the configuration processing, tasks may include allocating storage, specifying the logical and/or physical devices used for the storage allocation, specifying whether the data should be replicated, the particular RAID-level, and the like. With such options in connection with performing the configuration, a customer may not have the appropriate level of sophistication and knowledge needed. As well, errors encountered performing the tasks may also not have the appropriate level of sophistication and knowledge for a user to interpret the errors. Thus, it may be desirable to utilize a flexible implementation which assists customers in connection with interpreting errors while performing data storage services such as related to data storage configuration. It may be desirable that the technique be adaptable to the particular knowledge level of the user. The implementations that may be used in connection with performing data storage configuration and provisioning of the data storage in connection with a request, for example, to allocate a portion of data storage for use with an application hosting data on a data storage system. In particular, the implementation enable the system to report an error with the amount of information reported tailored to the level of skill of the user.

In one embodiment, a UI may provide for one or more different types of user interfaces and associated data. For example, the UI may provide support for a GUI, command line interface (CLI), and the like. As also described herein, one or more different user levels may be provided in accordance with different levels of user proficiency. A user may interact with a system utilizing the techniques herein at one or more of the user proficiency levels. The application provision requirements 102 may vary with each of the different user proficiency levels of interaction that may be provided in an embodiment. As well, the level of specificity in any particular error associated with a provisioning request may match the proficiency level of the user.

Each of the different user levels may provide a different logical view and level of abstraction with respect to a data storage task to be performed for an application executing on one of the hosts and any errors that may result from the attempted execution of the data storage task. Each of the different user levels may be provide with a different level of detail with respect at least some possible errors resulting from execution of the task in accordance with different levels of user sophistication and knowledge. The language or terminology of the UI and application provision requirements 102, UI data (e.g., content or data used to populate the UI menus), and UI presentation or structure (e.g., commands presented or particular hierarchical menu structure) may vary in accordance with the particular user level at which a user interacts with the data storage system as well as the application for which the provisioning request is being performed. Thus, a user may interact with the data storage system at a variety of different levels when issuing data storage configuration requests for the same application. The UI and application provision requirements may be customized for the particular level and application for which the request is performed.

As described in more detail in following paragraphs, each user level may result in a user being provided with a different user interface and display with respect to the generation of an error for a different level of user interaction and level of knowledge and sophistication. For example, with users interacting at a NOVICE level obtaining the greatest amount of automation of application best practices with an appropriate level of abstraction, and users interacting at other levels, such as INTERMEDIATE and EXPERT, obtaining a different appropriate level of abstraction and automation with respect to error generation.

For example, a NOVICE user level may be provided with a beginner or most simplistic view of the errors that occurs in data storage system and tasks performed for data storage configuration and provisioning in accordance with application best practices. NOVICE user level interactions require the least amount of knowledge about errors and may be geared toward interacting with users having minimal knowledge when performing a data storage configuration or provisioning request by providing the greatest level of abstraction of the underlying system and operations performed. The language and type of errors may be more non-technical in comparison to the interface language of other levels. As the user level increases (e.g., to INTERMEDIATE or EXPERT), so does the assumed level of knowledge of the user in connection with interactions. An EXPERT user level may be utilized by the most knowledgeable users providing a greatest granularity of error reporting of all user levels in connection with error in response to a data provisioning request. The EXPERT user level may expose more detailed information to the user than interactions at NOVICE and INTERMEDIATE levels.

Figure 7:
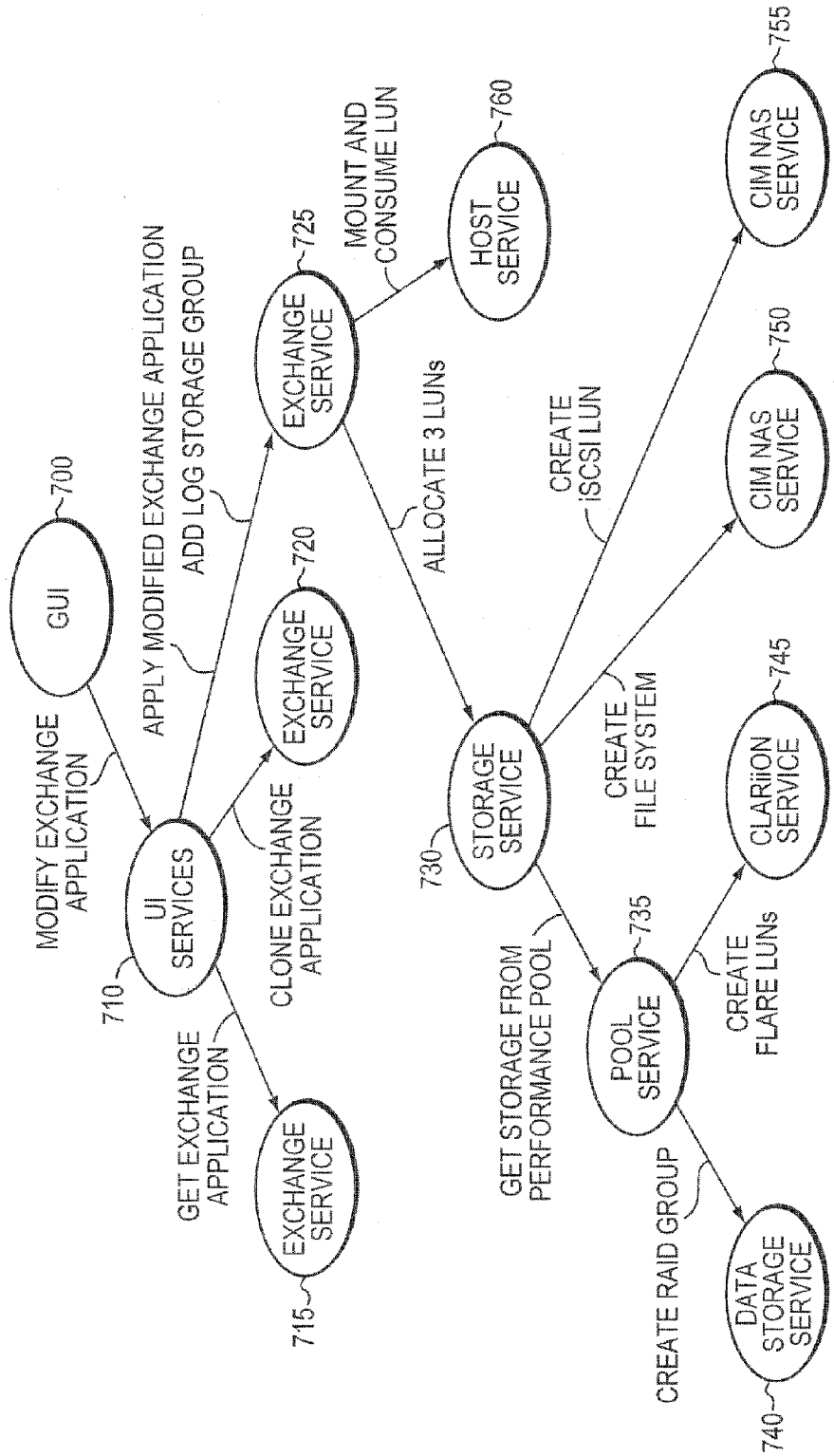
FIG. 7 is an example representation of how configuration of storage pools may flow through the storage system.

Referring to FIG. 7, an example of some interactions in an Exchange provisioning request are shown. For example, a user, via a GUI 700, could request an Exchange modification. This may result in UI Services 710 getting an instance of an Exchange application from Exchange Service 715. The UI Services 710 may also clone the instance of the Exchange application using Exchange Service 720. As well, the UI Services 710 may modify the application and then apply the modified instance of the Exchange application to add a log storage group and send this modification instance to Exchange service 725. This request to Exchange service 725 may result in two requests, namely an allocation request for an allocation of three LUNs, which allocation request is sent to Storage Service 730 and a second request sent to the Host Service 760 to mount and consume the LUNs.

The allocation request sent to the Storage Service 730 may rely on successful completion of three subtasks: (1) getting storage from the performance pool based on a first request sent to the Pool Service 735, (2) creating a file system based on a second request sent to the CIM NAS Service 750, and (3) creating an iSCSI LUN based on a third request sent to a CIM NAS Service 755. The Pool Service 735 may issue two subrequests, for creating a RAID Group to the CLARIION Service 745, and for creating Flare LUNs issued to a CLARIION Service 745, respectively. Any of these requests can fail, and most requests, and the operation as a whole, can only succeed if all of a particular request's subrequests also execute successfully. However, the level of detail reported to the user may depend on the skill level of the user requesting the allocation.

For example, a NOVICE level user may issue a request to provision storage for a number of mailboxes for storing data of an email application executing on one of the hosts. The NOVICE user may specify a minimal amount of information in connection with the request such as a number of mailboxes. A user may interface with the data storage system using a GUI and issue the data storage provision request. The language and terminology of user interactions via the GUI may be customized for the NOVICE user level of the email application. In response to an error of such a request, the NOVICE user is presented with a very simple error response, such as "operation failed".

In connection with the same email application, a more knowledgeable user may choose to issue a data storage provision request via a GUI for a same number of mailboxes by interacting with the data storage system at an INTERMEDIATE or EXPERT level. For example, an EXPERT user level may provide a more detailed information about the request regarding the underlying data storage device and how this data storage device is used by the application. To further illustrate, the EXPERT level data storage provision request may specify additional application-specific information, the physical and/or logical devices upon which storage is allocated, provide vendor-specific or data storage-specific attributes or settings, indicate a number and type of files or data storage volumes created, and the like, that may vary with application for which storage is being provisioned. As well, if an error were to occur, the EXPERT is given the highest level of error report and is able to see at the level at which the error occurred and why the provisioning request failed.

In another example, involving processing of candidate solution 504b, it is determined that there is an insufficient amount of FAST storage pool A storage for storing the data volumes of the single large SG. However, there is a sufficient amount of FAST storage pool A2 from which storage may be allocated for the 10 data volumes of SIZE1, and a sufficient amount of CHEAP storage in pool B from which to allocate storage for the 5 log volumes of SIZE2. As a result, the foregoing represents a possible way in which the solution 504b may be implemented given the available data storage system resources and candidate solution 504b storage requirements. Although both solutions 504a and 504b may be implemented given the currently available resources of the data storage system, solution 504a may be preferred over 504b since 504a is able to utilize at least a portion of the storage from FAST storage pool A. An embodiment may associate a level of fitness with each candidate solution. The level of fitness may be represented as a metric determined using any one or more different heuristics that may be used in an embodiment to rank the candidate solutions.

As described above, it may not be possible to implement a provisioning request due to insufficient available resources on the data storage system. In such instances, processing may be performed to indicate an error or status and recommend installation of additional storage devices in the data storage system in accordance with best practices. Some of these have been outlined above for the particular example. However, an embodiment may perform other alternatives and processing. For this example, an error may be generated for the EXPERT user, and may inform the user about how allocation of the mailboxes was performed at a very high level of granularity. An intermediate user may gain a lower level of granularity, while a novice may not receive any error or only a simple warning.

Description of Error Status

Figure 9:
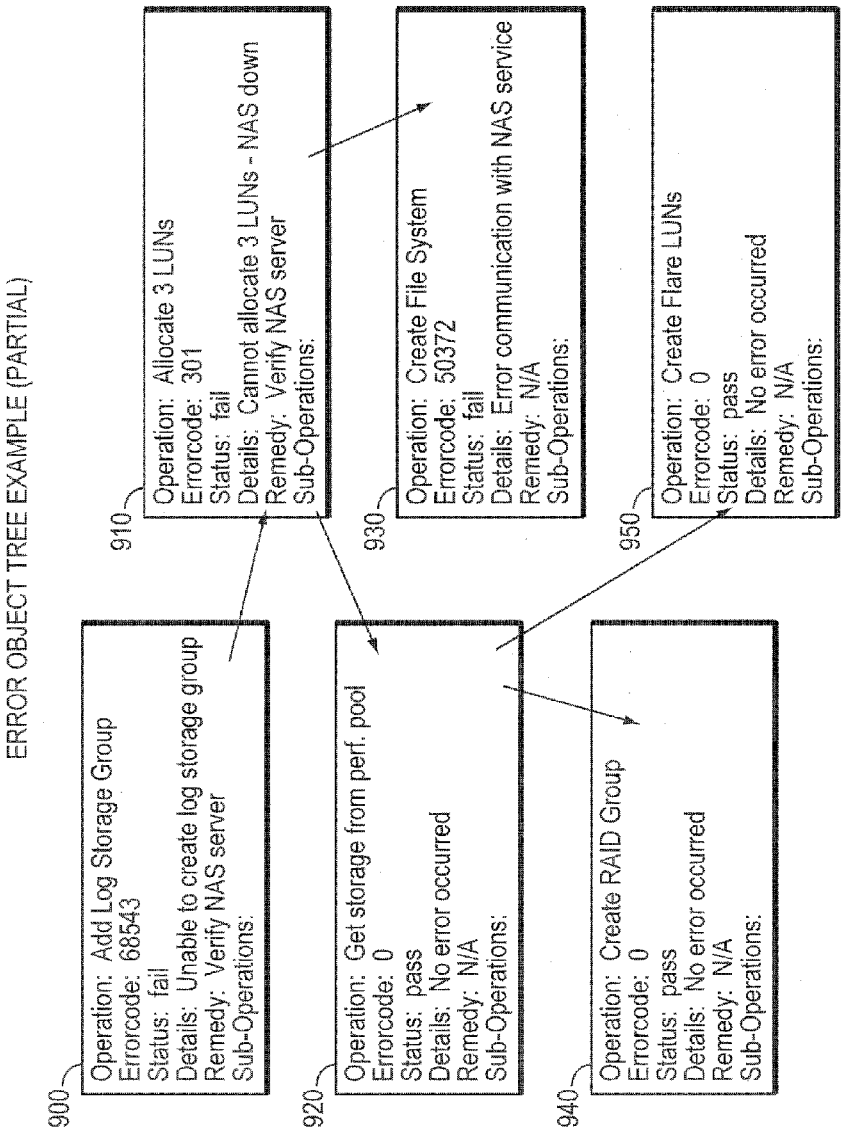
FIG. 9 illustrates an example embodiment of an error tree.

In an embodiment of the current technique, an overall structure of the error reporting may be that of a tree structure an example embodiment of which is shown in FIG. 9. This error tree structure may minor the sub-tasks of the provisioning request. With respect to each sub-task, information is collected and stored in an error structure such as the example embodiment of FIG. 8. For example, with reference to the provisioning request described in FIG. 5 in conjunction with FIG. 7, a particular request may occur in the GUI 700, which is then transmitted to the UI Services 710. This request propagates to the Exchange server service 725, storage Services 730, and host Service 760. That is, this request requires a number of sub-tasks or steps be successfully completed for the operation to be successfully completed. In a particular embodiment, each step may be represented as a leaf in the error tree type structure.

Referring now to FIG. 8, the error structure of each leaf or node may contain error information for the sub-task associated with that leaf or note. For example, in the embodiment of FIG. 8, the error information for any particular task contains the name of the sub-task, a specific or unique error code which may numerically map to the error, the status of the sub-task specified, details about the sub-task or failure, and instructions on how to fix or avoid the problem. As well, this error structure contains a link to other error objects.

The error structure of FIG. 8, in an embodiment, may also be exemplified by the following pseudo code.

```
/* class ComplexOperationError to describe errors and contain a list of sub
errors this class is used to build trees of return errors that are populated
in typical operation trees */
class ComplexOperationError
{
  public:
    // operation that was attempted
    // ID of the operation. Can be used to internationalize
    unsigned int OperationID;
    // name of the operation. Can be used directly for display or for
tracing and internal logging
    string OperationName;
    // error information
    // status code: pass | fail | not attempted
    EnumStatusCode StatusCode;
    // error code. This code is unique across all possible operations
    unsigned int ErrorCode;
    // reason for failure
    string. Reason;
    // remedy information. Note: this may be furnished in a different
format to allow
    // for internationalization
    string Remedy;
    // error return information from sub operations
    List<ComplexOperationsError> ErrorStatusesFromSubOperations;
};
```

In the embodiment of FIG. 8, the error structure 800 points to sub-tasks attempted by an overall system request. For example, as shown in FIG. 9, an "add log storage group" sub-task 900 may include five different sub-tasks 910, 920, 930, 940, and 950. Each sub-task can link to the next sub-task in the error tree type structure mirroring the call structure of the sub-tasks for a particular request.

In the embodiment of FIG. 8, the error structure points to sub-tasks attempted by an overall system request. For example, as shown in FIG. 9, an "add log storage group" sub-task 900 may include five different sub-tasks 9110, 920, 930, 940, and 950. Each sub-task can link to the next sub-task in the error tree type structure mirroring the call structure of the sub-tasks for a particular request.

FIG. 9 illustrates an embodiment of a portion of a particular error object tree for a provisioning request. As illustrated, the "Add Log Storage Group" 900 links to the sub function of "allocating 3 LUNS" 910. This allocation, in turn, has two sub functions "get storage from performance pool" 920 and "create file system" 930. As well, the "get storage from perf. Pool" 930 has two sub functions, "create RAID group" 940 and "Create Flare LUNs" 950. Each particular error structure not only has information about the particular function it represents, but also any sub-functionality necessary to accomplish that task. This provides particular error structure allows any particular error to be put it in context with respect what step in the process the error occurred.

In a particular embodiment, the error structure of FIG. 9, as applied to an Exchange provisioning request, may be represented by the following pseudo code:

```
ComplexOperationError provisionExchangeStorage(unsigned int NumberMailBoxes,
unsigned int MailboxSize)
{
  // initialize our error instance
  StorageGroupError provisionExchangeStorageError ComplexOperationError;
```

```
    provisionExchangeStorageError.OperationID = OPID_ProvisionExchangeStorage;
    provisionExchangeStorageError.OperationName = "Provision storage for
Exchange Mail Server";
    provisionExchangeStorageError.StatusCode = STATUSCODE_PASS;
    provisionExchangeStorageError.ErrorCode = ERROR_SUCCESS;
    // compute parameters per business logic
    unsigned int NumberStorageGroups = . . . ;
    for (unsigned int storageGroup = 0; storageGroup < NumberStorageGroups;
storageGroup++)
    {
      // compute parameters per business logic
      unsigned int StorageGroupSize = . . . ;
      ComplexOperationError provisionStorageGroupError =
provisonStorageGroup(StorageGroupSize, . . .) ;
      // evaluate and set status code
      if (provisionStorageGroupError.StatusCode) != STATUS_CODE_PASS)
      {
        // update our status code
        provisionExchangeStorageError.StatusCode = STATUSCODE_FAIL;
        provisionExchangeStorageError.ErrorCode =
ERROR_CANNOT_CREATE_STORAGEGROUP;
        provisionExchangeStorageError.Reason = "Cannot provision storage group
for Exchange server";
provisonExchangeStorageError.ErrorStatusesFromSubOperations.append(provision
StorageGroupError);
      }
    }
    // return the error object
    return provisionExchangeStorageError;
};
```

In this embodiment, the error structure is created using the class type of provisionExchangeStorage with the information pertaining to the number and size of mailboxes requested in this particular provisioning request. This example generates an error tree similar to that of FIG. 9.

Examples of Error Status with Respect to Provisioning

In FIG. 9, it can be seen that the operation of creating a file system has failed in sub-tasks Add Log Storage Group 900, Allocate 3 LUNs 910, and Create File System 930. In previous solutions, this type of error would result in one of two types of messages being shown to the user. For example in a previous approach, a single message stating the overall operation failed could be displayed in isolation such as is shown in Allocate 3 LUNs 910 or that of Create File System 930. As well, another previous approach may be to show an error stating that the operation failed in conjunction with a numerical error code such as 68543 of 900 could also be displayed. However, previous approaches would not provide further information as to the error or context surrounding the error.

Conversely, at least one implementation of the current technique, as shown in FIG. 9, shows exactly which sub-tasks in a particular overall operation, such as a provisioning request, failed (900, 910 and 930) and which sub-tasks executed successfully (920, 940, and 950). As well, the error structure provides a mapping to the sub-tasks needed to execute an overall operation. This information can be particularly helpful with it is necessary to denote exactly how the provisioning process failed.

Figure 10:
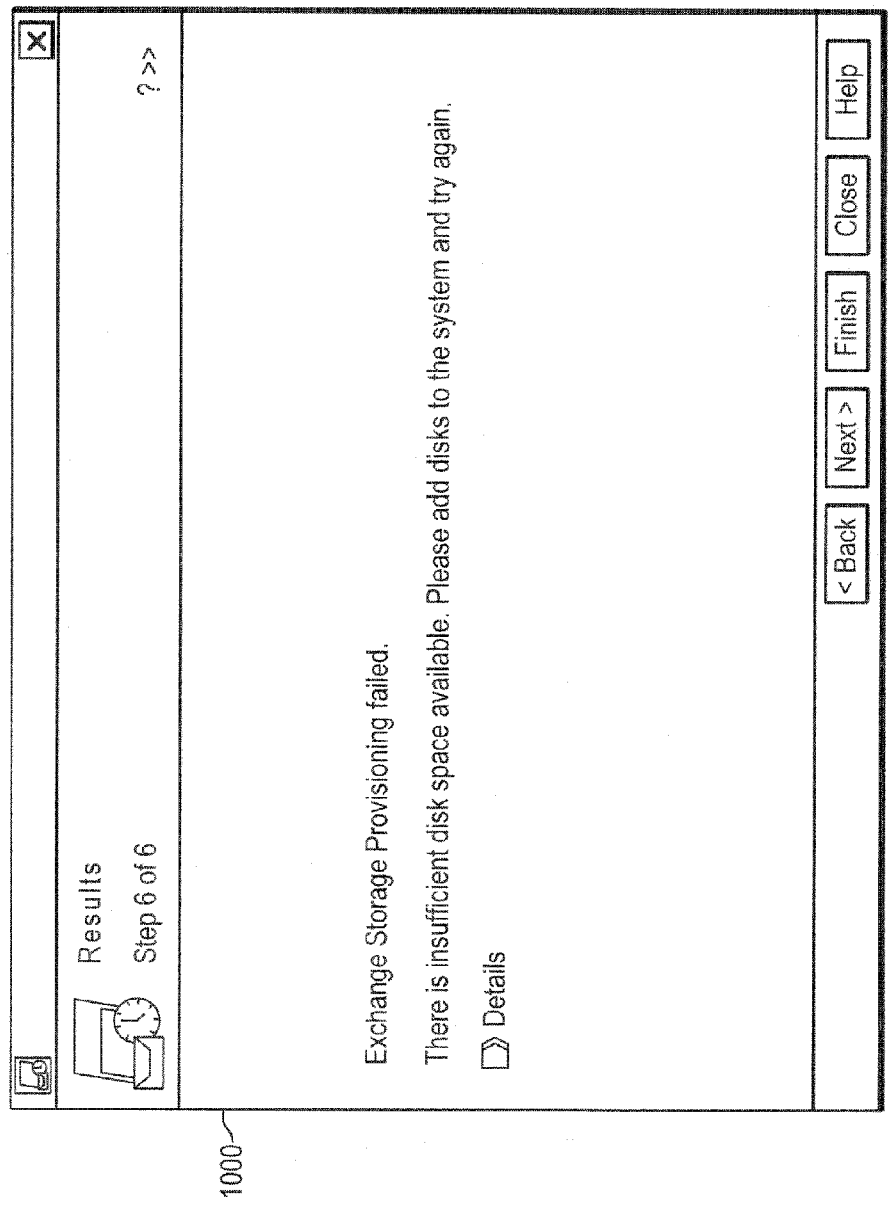
FIGS. 10-12 illustrates examples of errors that may be displayed for users with different skill levels.

While this error structure is capable of providing a rich description of the processes that failed or succeeded as well of the context of those sub-tasks, this also provides the system with many options to display some or all of this information to the user. That is, a high level error message, such as in error 1000, may be presented to a user, such as a NOVICE, that the overall operation failed, as shown in an example illustrated in FIG. 10. For many users, this type of error message is sufficient for the user to understand and take steps to rectify the problem. This type of general purpose remedy works well for many users and keeping the error level simpler can avoid confusion.

Figure 11:
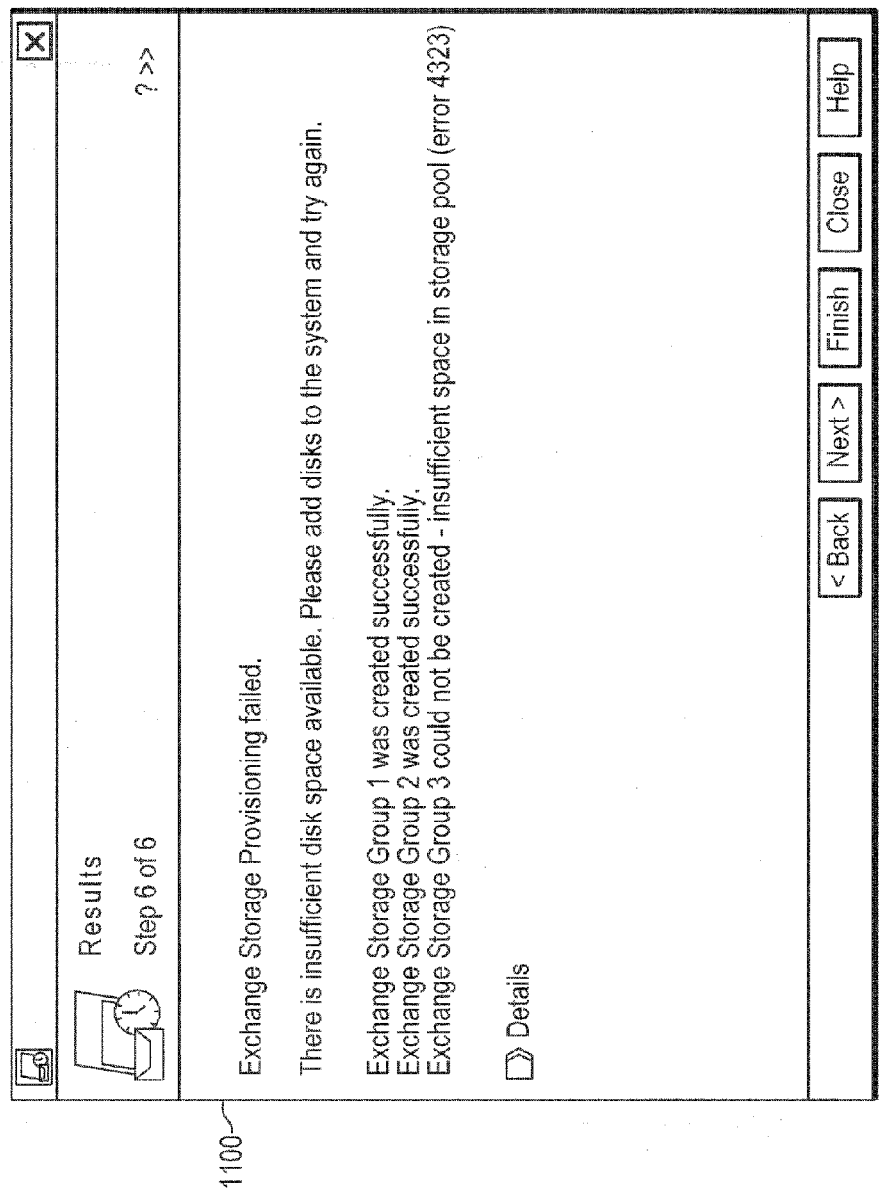

Conversely, an error message may be presented to the user 1100, such as an intermediate user, that the creation of the file system failed, as shown in an example illustrated in FIG. 11. Here, errors messages are displayed one level down, to indicate the errors at the application service level. The more experiences user can see how far the overall operation progressed. Specifically, the user can see that some of the storage groups could be created. This knowledge may allow the user to retry the provisioning request with a scaled back number of storage groups, adding more disk space and executing another provisioning request at a later time. However, this is a more advanced response to the problem and the additional level of specificity in the error message may simply confuse a NOVICE user.

Figure 12:
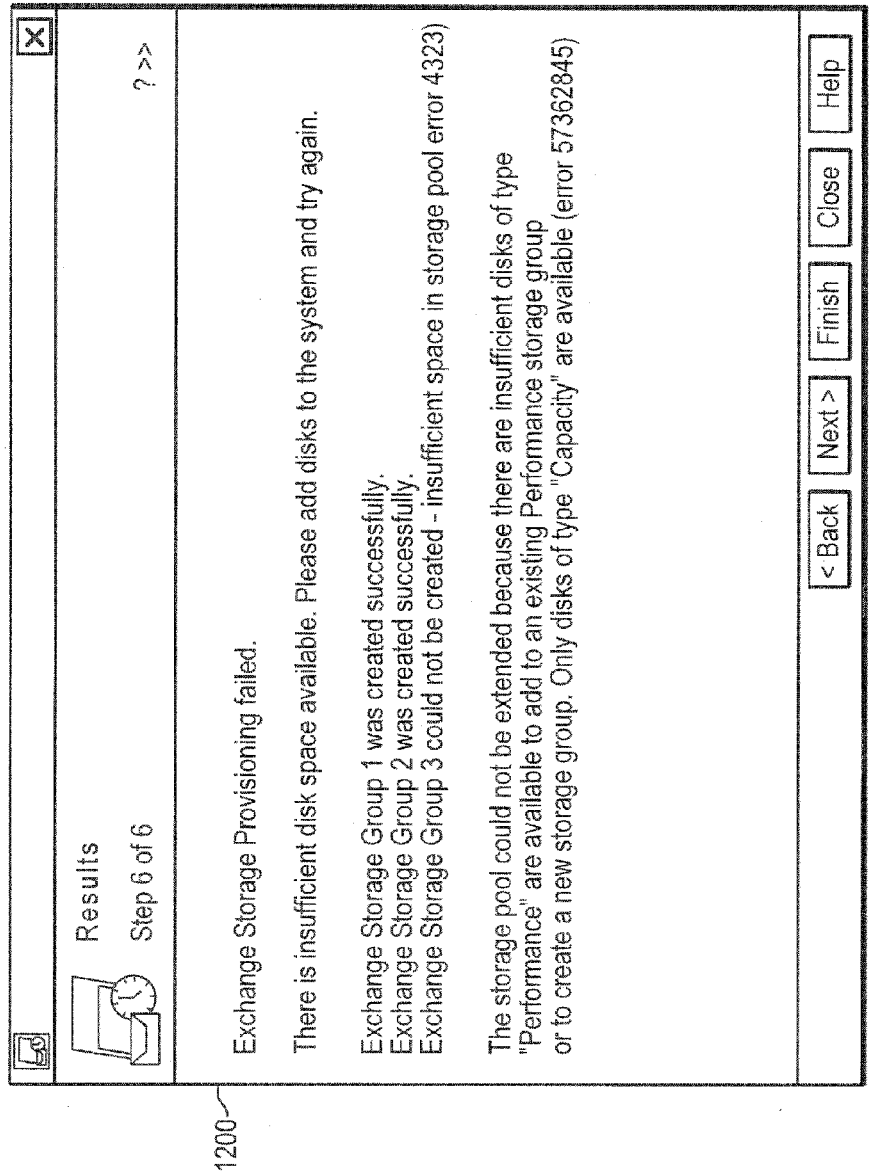

This may be in contrast to the error message 1200 of FIG. 12 presented to another EXPERT user. This may be the deepest level of information that is presented; for example in 1200 the information about the allocation policies. Here, and as noted in an example above, the Exchange application wants certain types of disks to ensure a given level of performance. There are not enough disks at the requisite level of performance to satisfy this request. In this case, the EXPERT user can change the provisioning policies to override the system defaults and provision the Exchange request with lower performance disks. While this may lead to slower performance of the system, this is a tradeoff that the EXPERT user is able to make. However, this additional level of information may simply confuse the NOVICE or INTERMEDIATE users.

The methods and apparatus of this invention may take the form, at least partially, of program code or logic (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

The logic for carrying out the method may be embodied as part of the system described below, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art will appreciate that the device is not limited to the specific configuration but rather only by the claims included with this specification.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in error handling, the method comprising:
    determining, from a plurality of user skill levels, a first user skill level of an associated requestor making a data storage configuration request, each user skill level of said plurality of user skill levels being associated with a respective different level of abstraction with respect to processing performed in the data storage system for servicing the data storage configuration request; wherein a level of abstraction with a higher level of skill is provided with more information than a level of abstraction associated with a lower level of skill and the skill levels are independent of the permissions of the associated requestor;
    servicing the data storage configuration request, wherein the data storage configuration request has one or more sub-tasks; wherein the one or more sub-tasks are executed independent of the skill level of the requestor;
    storing an indication of the success of each sub-task of the one or more sub-tasks of the data storage configuration request in an error structure for each sub-task of the one or more sub-tasks;
    based on the storing, recording, in one or more error trees whether each sub-task of the one or more sub-tasks of the data storage configuration request executed successfully; the one or more error trees corresponding to a structure of the data storage configuration request including the one or more sub-tasks, wherein the one or more error trees include a node corresponding to the each sub-task of the one or more sub-tasks; wherein each node denotes a status of the corresponding each sub-task; wherein each node corresponds to a level of levels; wherein each level of the levels indicates a different level of abstraction with respect to the data storage configuration request; and
    based on the first user skill level and in response to a status request, determining what level of the levels to display to the user based on the first user skill level; displaying a report of the status of the data storage configuration request including the status of the sub-tasks indicated in the nodes corresponding to the determined level as recorded in the one or more error trees.

2. The method of claim 1 wherein the plurality of user levels comprises a novice user level and an expert user level.

3. The method of claim 1 wherein the report indicates the status of each of the sub-tasks.

4. The method of claim 1 wherein the report indicates the success of the data storage configuration request.

5. The method of claim 1 wherein the report indicates each of the failed sub-tasks.

6. The method of claim 1 wherein the error structure enables indication of an error code, a specific reason information, and a pass/fail/not attempted status.

7. A system for use in identity assurance, the system comprising:
    a computer having a memory;
    computer-executable program code operating in memory, wherein the computer-executable program code is configured for execution of the following steps:
    determining, from a plurality of user skill levels, a first user skill of an associated requestor making a data storage configuration request, each user skill level of said plurality of user skill levels being associated with a respective different level of abstraction with respect to processing performed in the data storage system for servicing the data storage configuration request; wherein a level of abstraction with a higher level of skill is provided with more information than a level of abstraction associated with a lower level of skill and the skill levels are independent of the permissions of the associated requestor;
        servicing the data storage configuration request, wherein the data storage configuration request has one or more sub-tasks; wherein the one or more sub-tasks are executed independent of the skill level of the requestor;
    storing, an indication of the success of each sub-task of the one or more sub-tasks of the data storage configuration request in an error structure for each sub-task of the one or more sub-tasks;
    based on the storing, recording, in one or more error trees whether each sub-task of the data storage configuration request executed successfully; the one or more error trees mirrored to a structure of the data storage configuration request including the one or more sub-tasks, wherein the one or more error trees include a node corresponding to the each sub-task of the one or more sub-tasks; wherein each node denotes a status of the corresponding each sub-task; wherein each node corresponds to a level of levels; wherein each level of the levels indicates a different level of abstraction with respect to the data storage configuration request; and
    based on the first user skill level and in response to a status request, determining what level of the levels to display to the user based on the first user skill level; displaying a report of the status of the data storage configuration request including the status of the sub-tasks indicated in the nodes corresponding to the determined level as recorded in the one or more error trees.

8. The system of claim 7 wherein the plurality of user levels comprises a novice user level and an expert user level.

9. The system of claim 7 wherein the report indicates the status of each of the sub-tasks.

10. The system of claim 7 wherein the report indicates the success of the data storage configuration request.

11. The system of claim 7 wherein the report indicates each of the failed sub-tasks.

12. The system of claim 7 wherein the error structure enables indication of an error code, a specific reason information, and a pass/fail/not attempted status.

13. A program product comprising:
a non-transitory computer-readable storage medium encoded with computer-executable program code enabling:
determining, from a plurality of user skill levels, a first user skill level of an associated requestor making a data storage configuration request each user skill level of said plurality of user skill levels being associated with a respective different level of abstraction with respect to processing performed in the data storage system for servicing the data storage configuration request; wherein a level of abstraction with a higher level of skill is provided with more information than a level of abstraction associated with a lower level of skill and the skill levels are independent of the permissions of the associated requestor;
    servicing the data storage configuration request, wherein the data storage configuration request has one or more sub-tasks; wherein the one or more sub-tasks are executed independent of the skill level of the requestor;
storing, an indication of the success of each sub-task of the one or more sub-tasks of the data storage configuration request in an error structure for each sub-task of the one or more sub-tasks;
based on the storing, recording, in one or more error trees whether each sub-task one or more of the data storage configuration request executed successfully; the one or more error trees mirrored to a structure of the data storage configuration request including the one or more sub-tasks, wherein the one or more error trees include a node corresponding to the each sub-task of the one or more sub-tasks; wherein each node denotes a status of the corresponding each sub-task; wherein each node corresponds to a level of levels; wherein each level of the levels indicates a different level of abstraction with respect to the data storage configuration request; and
based on the first user skill level and in response to a status request, determining what level of the levels to display to the user based on the first user skill level; displaying a report of the status of the data storage configuration request including the status of the sub-tasks indicated in the nodes corresponding to the determined level as recorded in the one or more error trees.

14. The program product of claim 13 wherein the plurality of user levels comprises a novice user level and an expert user level.

15. The program product of claim 13 wherein the report indicates the status of each of the sub-tasks.

16. The program product of claim 13 wherein the report indicates the success of the data storage configuration request.

17. The program product of claim 13 wherein the report indicates each of the failed sub-tasks.

18. The program product of claim 13 wherein the error structure enables indication of an error code, a specific reason information, and a pass/fail/not attempted status.

* * * * *